US007826844B2

(12) United States Patent
Cooper

(10) Patent No.: US 7,826,844 B2
(45) Date of Patent: Nov. 2, 2010

(54) METHOD AND APPARATUS FOR EFFICIENT SELECTION AND ACQUISITION OF A WIRELESS COMMUNICATIONS SYSTEM

(75) Inventor: Rotem Cooper, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/092,770

(22) Filed: Mar. 6, 2002

(65) Prior Publication Data

US 2003/0134637 A1 Jul. 17, 2003

Related U.S. Application Data

(60) Provisional application No. 60/349,880, filed on Jan. 16, 2002.

(51) Int. Cl.
*H04W 4/00* (2009.01)

(52) U.S. Cl. .............. 455/435.3; 455/435.1; 455/435.2; 455/432.1; 455/432.3; 455/423; 455/424; 455/67.11; 455/67.13; 455/512; 455/513; 455/514; 455/166.2

(58) Field of Classification Search .............. 455/422.1, 455/432.1, 432.2, 432.3, 435.1, 435.2, 512, 455/513, 514, 450, 435.3, 434, 418, 425
See application file for complete search history.

(56) References Cited

U.S. PATENT DOCUMENTS

| 5,109,390 | A |   | 4/1992  | Gilhousen et al. |         |
|-----------|---|---|---------|------------------|---------|
| 5,586,338 | A | * | 12/1996 | Lynch et al.     | 455/433 |
| 5,613,204 | A | * | 3/1997  | Haberman et al.  | 455/432.3 |
| 5,870,674 | A | * | 2/1999  | English          | 455/432.2 |
| 5,870,676 | A | * | 2/1999  | Durvasula et al. | 455/450 |

(Continued)

FOREIGN PATENT DOCUMENTS

WO 9736443 10/1997

(Continued)

OTHER PUBLICATIONS

International Search Report—PCT/US03/01541, International Search Authority—European Patent Office—May 27, 2003.

(Continued)

*Primary Examiner*—Charles N Appiah
*Assistant Examiner*—Wille J Daniel, Jr.
(74) *Attorney, Agent, or Firm*—Darren M. Simon

(57) ABSTRACT

A mobile station includes processing circuitry and a memory storing a preferred roaming list and system priority data. The processing circuitry is adapted to detect a communications event for a currently selected wireless communications system and update an entry in the system priority data to reflect the occurrence of the detected communications event. The use of stored statistical information improves the efficiency of the system selection and acquisition process. In operation, a group of wireless communications systems is selected from the preferred roaming list in accordance with a predetermined system acquisition procedure. The group is reprioritized using the priority data and the mobile station attempts to select the wireless communications system having the highest priority in the reprioritized group. The reprioritization may include sorting the group using the priority data and removing systems from the group that do not meet certain priority criteria.

20 Claims, 4 Drawing Sheets

U.S. PATENT DOCUMENTS

| | | | |
|---|---|---|---|
| 5,960,350 A * | 9/1999 | Schorman et al. | 455/450 |
| 6,085,085 A * | 7/2000 | Blakeney et al. | 455/426.1 |
| 6,148,197 A | 11/2000 | Bridges et al. | 455/432 |
| 6,223,042 B1 | 4/2001 | Raffel | |
| 6,311,064 B1 * | 10/2001 | Bamburak et al. | 455/434 |
| 6,466,802 B1 * | 10/2002 | Blakeney et al. | 455/552.1 |
| 6,587,686 B1 * | 7/2003 | Cuffaro et al. | 455/423 |
| 6,625,451 B1 * | 9/2003 | La Medica et al. | 455/434 |
| 6,782,259 B2 * | 8/2004 | Bamburak et al. | 455/434 |
| 2005/0113089 A1 * | 5/2005 | Bamburak et al. | 455/435.2 |

FOREIGN PATENT DOCUMENTS

| | | |
|---|---|---|
| WO | 9901001 | 1/1999 |
| WO | WO 0101666 A1 * | 1/2001 |

OTHER PUBLICATIONS

International Preliminary Examination Report—PCT/US03/01541, IPEA/US—Jan. 2, 2004.

Written Opinion—PCT/US03/01541, International Search Authority—IPEA/US—Oct. 23, 2003.

* cited by examiner

SYSTEMS TABLE 100

| SID | NID | P/N | Region | Desirability | AT Pointer |
|---|---|---|---|---|---|
| 100a | 100b | 100c | 100d | 100e | 100f |

FIG. 3a

ACQUISITION TABLE 102

| Mode | Band | Frequency |
|---|---|---|
| 102a | 102b | 102c |

FIG. 3b

PRIORITY DATA 104

| SID | NID | Date/Time | Signal Acquisition | Power Measurement | System Access | System Lost |
|---|---|---|---|---|---|---|
| 104a | 104b | 104c | 104d | 104e | 104f | 104g |

FIG. 4

PRIORITY DATA SUMMARY TABLE 106

| SID | NID | Date/Time | Acquisition Success Rate | Last Power Measurement | Access Success Rate | System Lost Rate | Priority Metric |
|---|---|---|---|---|---|---|---|
| 106a | 106b | 106c | 106d | 106e | 106f | 106g | 106h |

FIG. 5

METHOD AND APPARATUS FOR EFFICIENT SELECTION AND ACQUISITION OF A WIRELESS COMMUNICATIONS SYSTEM

RELATED APPLICATIONS

This application claims priority to U.S. Provision Patent Application No. 60,349,880, filed on Jan. 16, 2002.

BACKGROUND OF THE INVENTION

1. Field of the Invention

The present invention relates generally to wireless communications and, in particular, to a method and apparatus for efficiently acquiring a preferred wireless communications system.

2. Description of the Related Art

A mobile device will often have access to more than one wireless communications system in its geographic region. The quality of the wireless services available to the mobile device may vary from system to system depending on the equipment used by each system, the features of the mobile device, the distance between the mobile device and local base stations, physical obstructions such as buildings and hills, and the volume of communications traffic on each system. The wireless communications systems may also support different multiple-access wireless communications protocols such as code division multiple access (CDMA), wideband CDMA (WCDMA), Advanced Mobile Phone Service (AMPS), Global System for Mobile communications (GSM), General Packet Radio Services (GPRS) or High Data Rate (HDR) technology (e.g., 1xEV technology). In addition, the fees charged to a user of the mobile device may vary depending on the time of day, the duration of the connection with the wireless communications system and whether the mobile device is listed as a subscriber of the wireless communications system.

To assist with the selection of an available wireless communications system, conventional mobile devices store data describing known systems in a preferred roaming list (PRL). The PRL typically includes a systems table which stores a system identifier (SID) and a network identifier (NID) for each known wireless communications system, and an acquisition table which stores acquisition parameters including band, frequency and mode for the known wireless communications systems. Within the systems table, the wireless communications systems are often grouped by geographic region and sorted from the most desirable to the least desirable system in each region. The most desirable system in a particular geographic region is typically a subscriber system, but may also be a roaming system that offers the mobile device a favorable combination of low cost and high quality of service. Roaming systems offer wireless services to non-subscriber mobile devices, usually at a much higher fee than subscription services, and may be desirable when the mobile device enters a geographic region that is outside the coverage area of the mobile device's subscription service, when the subscription services are blocked or otherwise unavailable, or when the subscription services are only available at an unacceptably low level of quality.

During a mobile device's power-up sequence, attempts are made to acquire and register with the most desirable wireless communications system that is available to the mobile device in its current geographic region. In one approach, the mobile device identifies its current geographic region and then steps through the entries in the systems table, from the most desirable system in the identified geographic region to the least desirable system in the identified geographic region, until a system acquisition and registration attempt is successful. The mobile device may also attempt to acquire and register with a new wireless communications system during operation. For example, the connection between the mobile device and a current wireless communications system may be lost, requiring the acquisition of a new system by the mobile device. In addition, the wireless communications systems that are available to the mobile device may change as the position of the mobile device and its surrounding environment changes. To provide the user of the mobile device with the best combination of high quality and low cost, many mobile devices periodically attempt to acquire and register with a wireless communications system that is more desirable than the wireless communications system that is currently used by the mobile device. The mobile device searches the systems table for wireless communications systems in its geographic region that are more desirable than the current system and, if more desirable systems are found in the systems table, the mobile device will switch away from the current communications channel and attempt to acquire and register with one of the more desirable systems.

A system acquisition sequence, such as the system acquisition sequences described above, will often include a series of failed attempts to acquire a signal and register with the corresponding wireless communications system, followed by a single successful system acquisition and registration. These failed registration/acquisition attempts are common, time consuming and may be caused by a variety of factors. For example, the mobile device may be unable to detect a pilot signal transmitted from a system base station if the pilot signal is blocked or weakened by physical obstructions, or if the mobile device is outside the base station's coverage area. Registration with the system may fail if the mobile device and the system use incompatible protocol revisions and hardware, or if system otherwise rejects the registration attempt of the mobile device.

In view of the above, there is a need in the art for a method and apparatus for efficiently acquiring and registering with a wireless communications system.

SUMMARY OF THE INVENTION

The present invention is a method and apparatus for efficiently selecting and acquiring a wireless communications system. In a preferred embodiment, a mobile station includes processing circuitry and a memory storing a preferred roaming list and system priority data. The processing circuitry is adapted to select a plurality of wireless communications systems from the preferred roaming list for use in system acquisition attempts. The selected systems are reprioritized using the system priority data, resulting in a more efficient system acquisition order.

The processing circuitry includes a control processor for controlling the operation of the mobile station, a signal processor, a searcher, and a system determination unit. The memory stores a preferred roaming list (PRL) that includes a list of known wireless communications systems that are used by the mobile station during attempts to acquire and register with a system. The PRL preferably includes a systems table storing a list of system identifiers and corresponding desirability and geographic information, and an acquisition table that stores a list of acquisition parameters that are necessary for the acquisition of the wireless communications systems listed in the systems table. In a preferred embodiment, the PRL is maintained by an external source, such as the mobile station's wireless service provider.

The priority data is stored as a table in a nonvolatile memory and provides a statistical history of the mobile station's system acquisition/registration attempts. Each entry in the priority data corresponds to a single system acquisition/registration attempt and includes an identifier of one or more wireless communications systems, such as a SID/NID pair or a mode and frequency combination. The priority data also includes a date and time of the acquisition/registration attempt and data corresponding to one or more communications events such as an identifier of whether the system was acquired, a power measurement of a received signal, an identifier of whether access to the system was granted and an identifier of whether the system was lost.

The priority data is analyzed by the processing circuitry to form a prediction of whether a future system acquisition/registration attempt on an identified wireless communications system is likely to be successful. In a preferred embodiment, priority summary data is maintained in a separate table that may include fields for a system acquisition failure rate, a system access success rate, a system access failure rate, a system lost rate and a priority metric. The priority data is preferably maintained by the system determination unit. After a system acquisition/registration process has begun, an entry is added to the priority data and a system identifier corresponding to the currently selected wireless communications system is stored. The entry is updated in response to detected communications events that may include an acquisition attempt, acquisition failure or success, power measurement or system loss.

In a preferred system acquisition sequence, a group of wireless communications systems is selected from a stored list of systems in accordance with a predetermined system acquisition procedure. Next, the group of selected wireless communications systems is reprioritized using the corresponding desirability information and priority criteria for each system. In one embodiment, a plurality of the selected systems have the same level of desirability and the systems at each desirability level are sorted using the system priority data, from the system that is most likely to be acquired to the system that is least likely to be acquired. In a first alternative embodiment, the entire group of selected systems is sorted using the selected priority criteria. For example, the systems may be sorted using a priority metric that combines desirability information and priority data in a single score. In a second alternative embodiment, the desirability information for each selected system may be adjusted up or down based on the priority criteria. The selected systems are then sorted by the adjusted desirability information. In a third alternative embodiment, systems that are unlikely to be usable based on the corresponding priority criteria are removed from the group of wireless communications systems.

After the selected systems are reprioritized, the mobile station attempts to acquire and register with a wireless communications system. The system having the highest level of priority is selected first from the group of wireless communications systems and an attempt is made to acquire and register with the selected system. If the acquisition/registration attempt is successful, then the selected system is used by the mobile station for wireless communications. If the acquisition/registration attempt is not successful, the wireless communications system having the next highest priority is selected from the group and another system acquisition/registration is attempted.

A more complete understanding of the Method and Apparatus for Efficient Selection and Acquisition of a Wireless Communications Systems will be afforded to those skilled in the art, as well as a realization of additional advantages and objects thereof, by a consideration of the following detailed description of preferred embodiments. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3a is a systems table in accordance with a preferred embodiment of the present invention;

FIG. 3b is an acquisition table in accordance with a preferred embodiment of the present invention;

FIG. 4 is a preferred data structure for storing priority data;

FIG. 5 is a preferred data structure for storing priority summary data;

DETAILED DESCRIPTION OF A PREFERRED EMBODIMENT

Figure 1:
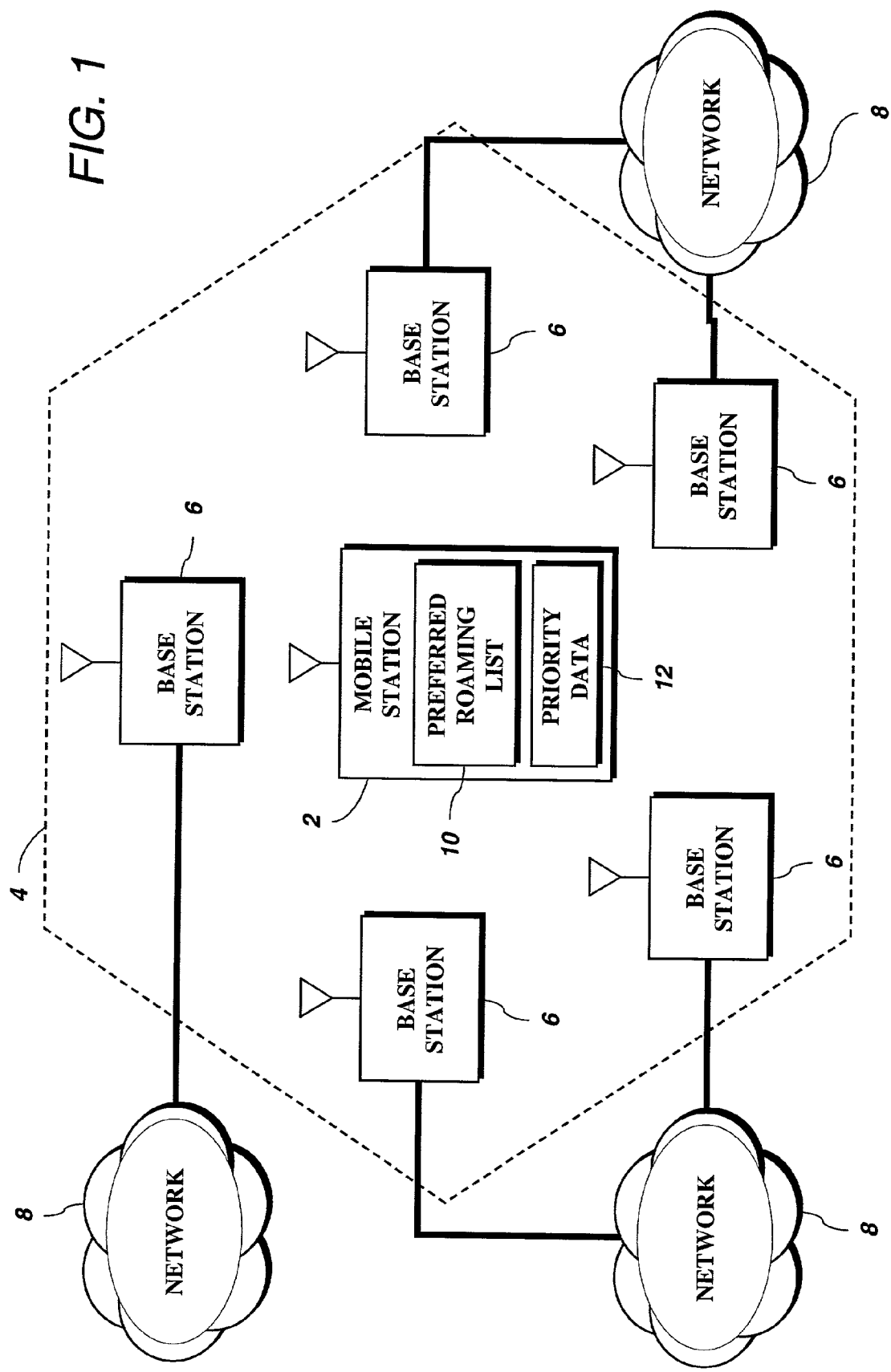
FIG. 1 illustrates a preferred embodiment of the present invention.

A preferred embodiment of the present invention will now be described with reference to FIG. 1. A mobile station 2 operates in a geographic region 4 that is serviced by at least one base station 6. Each base station 6 is connected to a network 8, which is part of a larger wireless communications system that supports at least one multiple-access wireless communications protocol, such as code division multiple access (CDMA), wideband CDMA (WCDMA), Advanced Mobile Phone Service (AMPS), Global System for Mobile communications (GSM), General Packet Radio Services (GPRS) or High Data Rate (HDR) technology (e.g., 1×EV technology). The mobile station 2 may be any wireless device, whether stationary or mobile, that is adapted for wireless communications with at least one base station 6, such as a cellular telephone, pager, personal digital assistant (PDA), vehicle navigation system or portable computer.

The mobile station 2 preferably includes a list of known wireless communications systems, such as preferred roaming list (PRL) 10, and system priority data 12. The PRL 10 is stored in a nonvolatile memory of the mobile station 2 and includes a list of wireless communications systems and corresponding acquisition parameters that are used by the mobile station 2 during attempts to acquire and register with a wireless communications system. In a preferred embodiment, the wireless communications systems listed in the PRL 10 are grouped by geographic region and sorted from the most desirable to the least desirable system in each region. As known in the art, the PRL 10 may be maintained by the mobile station's wireless service provider and include a list of wireless communications systems that are available to the mobile station 2 through its wireless service provider or other wireless service providers that have agreed to provide roaming services to the mobile station 2. The system priority data 12 is maintained by the mobile station 2 in a nonvolatile memory and includes a list of wireless communications systems and corresponding priority information. Using the priority information, the mobile station 2 determines whether a future acquisition/registration attempt on a corresponding system is likely to be successful and whether the system is likely to be useable if the acquisition/registration attempt is successful.

In operation, the mobile station 2 attempts to acquire and register with an available wireless communications system that offers wireless services to the mobile station 2. First, a group of wireless communications systems is selected from the PRL 10 in accordance with a predetermined system acquisition procedure. The selected group of systems have an order of priority that may be used by the mobile station 2 during system acquisition and registration attempts. For example, in a preferred embodiment the wireless communications systems in the mobile station's geographic region 4 are selected and sorted from the most desirable to the least desirable system in the current geographic region 4. Next, the group of systems is reprioritized using the system priority data 12 to produce a more efficient system acquisition order. In one embodiment, systems that are unlikely to be acquired are removed from the group of systems. In a second embodiment, systems having the same level of desirability are sorted to give a higher priority to the systems that are most likely to be acquired. After the group of systems is reprioritized, the mobile station 2 selects the system from the group that has the highest level of priority and attempts to acquire and register with the selected system. This selected system is preferably a system that is highly desirable, as measured by the corresponding desirability information, and has a high likelihood of being acquired, as measured by the system priority data 12. If the acquisition/registration attempt is successful, the selected system is used by the mobile station 2 for wireless communications. Otherwise, an attempt is made to acquire/register with the system from the group having the next highest priority.

Figure 2:
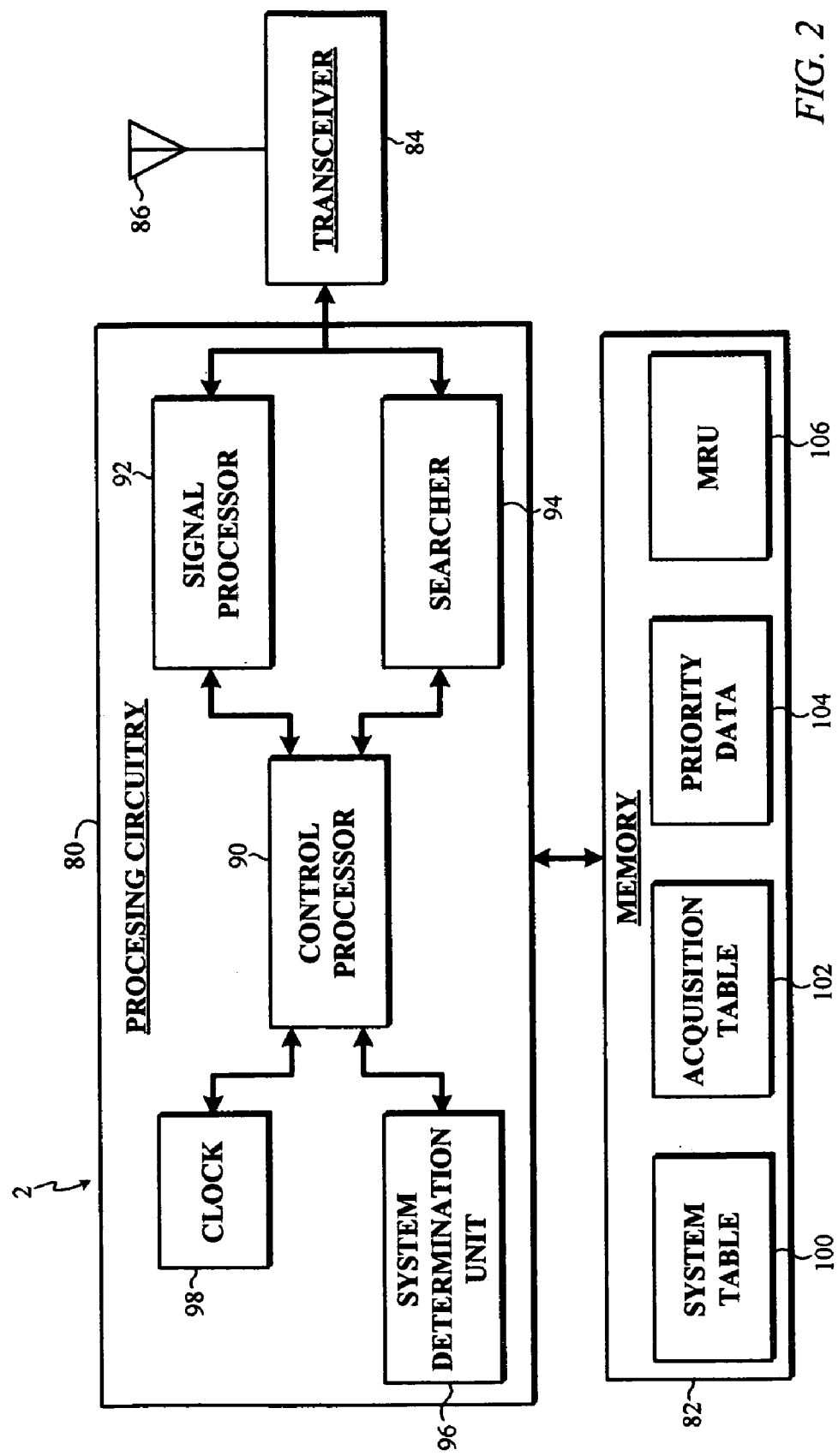
FIG. 2 is a mobile station in accordance with a preferred embodiment of the present invention.

Referring to FIG. 2, a preferred embodiment of the mobile station 2 will now be described. The mobile station 2 includes processing circuitry 80, a memory 82, a communications transceiver 84 and an antenna 86. The processing circuitry 80 preferably includes a control processor 90 for controlling the operation of the mobile station 2, a signal processor 92, a searcher 94, a system determination unit 96 and a clock 98. The memory 82 preferably includes both volatile and nonvolatile random access memories that store a preferred roaming list, including a systems table 100 and an acquisition table 102, and priority data 104. The memory 82 may also store one or more lookup tables, such as a list of the most recently used systems 106, and program instructions for execution by the processing circuitry 80.

The searcher 94 is adapted to identify valid signals, such as pilot signals, synchronization channels and paging channels received by the transceiver 84 through the antenna 86. The design and implementation of searcher hardware for CDMA acquisition is described in U.S. Pat. No. 5,109,390, entitled "DIVERSITY RECEIVER IN A CDMA CELLULAR TELEPHONE SYSTEM," assigned to the assignee of the present invention, and is incorporated herein by reference. The system determination unit 96 is adapted to select one or more wireless communications systems from the systems table 100 and retrieve corresponding acquisition parameters from the acquisition table 102. The system determination unit 96 is further adapted to forward the acquisition parameters to the searcher 94, which attempts to acquire one the selected systems. In an alternative embodiment, the system determination unit 96 is adapted to determine whether the current wireless communications system is the most desirable system in the mobile device's current geographic region and, when more desirable systems are available, initiate attempts by the mobile station 2 to acquire a more desirable system. A method and apparatus for performing preferred system selection in a mobile station that is capable of operation in a plurality of geographic regions is disclosed in U.S. Pat. No. 6,085,085, entitled "METHOD AND APPARATUS FOR PERFORMING PREFERRED SYSTEM SELECTION," assigned to assignee, and is incorporated herein by reference.

Referring to FIGS. 2 and 3*a*, a preferred embodiment of the systems table 100 will now be described. The systems table 100 includes a list of wireless communications systems that the mobile station 2 uses during attempts to acquire and register with a wireless communications system. As illustrated, each record in the systems table 100 preferably includes a system identifier (SID) 100*a*, a network identifier (NID) 100*b*, an indication of whether the system is preferred or negative (P/N) 100*c*, an identifier of the geographic region (Region) 100*d* that is covered by the system, desirability information 100*e* and a pointer (AT Pointer) 100*f* to a record in the acquisition table 102. Each wireless communications system listed in the systems table 100 is identified through a unique SID 100*a*, NID 100*b* pair and is designated as either a preferred system that may be used by the mobile station 2 during roaming, or a negative system that should not be used by the mobile device 2 during roaming through P/N 100*c*. In alternative embodiments, the wireless communications systems listed in the systems table 100 may be identified using other system identifiers, such as an Internet Protocol Version 6 (IPV6) address or a Public Land Mobile Network (PLMN) identifier. The wireless communications systems are preferably grouped by geographic region 100*d* and stored in the systems table 100 in sorted order from the most desirable system to the least desirable system in each region using the desirability information 100*e*. In a preferred embodiment, the desirability information 100*e* is a numerical value that identifies a relative priority of the corresponding wireless communications system.

FIG. 3*b* illustrates a preferred embodiment of the acquisition table 102. The acquisition table 102 includes a list of parameters that are necessary for the acquisition of the wireless communications systems listed in the systems table 100. As illustrated, each record in the acquisition table 102 preferably includes a mode 102*a*, a band 102*b* and a frequency 102*c*. The systems table 100 and the acquisition table 102 are preferably stored in a nonvolatile memory and updated periodically by an external source, such as the mobile station's wireless service provider, through downloads across a wireless connection or through another data transfer method. It will be appreciated that alternative configurations for the PRL, the systems table 100 and the acquisition table 102 may be used in accordance with the preferred embodiment of the no present invention.

As known in the art, the systems table 100 specifies a preferred system acquisition order to be used by the mobile station 2 during system acquisition/registration attempts. This system acquisition order, however, is not the most efficient order for acquiring and registering with a wireless communications system. The system acquisition order set forth in the systems table 100 is typically set by the mobile station's wireless services provider based on factors that are unrelated to the likelihood that each of the listed systems will be usable by the mobile station 2. For example, the system selection order may be determined using criteria such as the cost of using the system, the quality of the communications service offered by the system, protocol used by the system, support for unique features and whether the mobile station 2 is listed as a subscriber of the wireless communications system. In addition, the systems table 100 includes static information about known systems and does not always reflect changes in the environment that render a particular system unusable to the mobile station 2.

To improve the efficiency of the system acquisition/registration process, the mobile station 2 maintains statistical information for a plurality of known systems in the priority data 104. A preferred embodiment of the priority data 104 will now be described with reference to FIGS. 2 and 4. The priority data 104 is stored as a table in a nonvolatile memory of the mobile station 2 and provides a recent history of the mobile station's system acquisition/registration attempts. Each entry in the priority data 104 corresponds to a single system acquisition/registration attempt and includes an identifier of one or more wireless communications systems, such as a unique SID 104a/NID 104b pair or a unique mode and frequency combination. The priority data 104 further includes a date and time 104c of the acquisition/registration attempt and data corresponding to one or more communications events, such as an identifier of whether the signal was acquired 104d, a power measurement of the received signal 104e, an identifier 104f of whether access to the system was granted and an identifier 104g of whether the system was lost. It will be appreciated that other communications events may tracked, such as the received power of the system or the signal to noise ratio $E_c/I_o$, where $E_c$ is the strength of a received signal and $I_o$ is the total thermal noise on a corresponding channel. As known in the art, if the ratio $E_c/I_o$ is relatively large, then there is a high probability that a corresponding CDMA system may be acquired.

In a first preferred embodiment, the priority data 104 has a maximum size n and includes an entry for each of the last n system acquisition/registration attempts by the mobile station 2. In a second preferred embodiment, the priority data 104 includes a fixed number of entries k for each system identifier and that stores information describing each of the last k attempts by the mobile station 2 to acquire and register with the corresponding system. In a third preferred embodiment, entries in the priority data 104 are deleted after a certain duration as measured by the difference between a current date and time and the stored date and time 104c.

The priority data 104 is analyzed by the processing circuitry 80 to predict whether a future system acquisition/registration attempt on an identified wireless communications system is likely to be successful and whether the system is likely to be useable if the acquisition/registration attempt is successful. For example, the processing circuitry 80 may use the priority data 104 to calculate a system acquisition success rate of an identified system by dividing the total number of successful acquisition attempts by the total number of acquisition attempts. Other priority criteria may also be calculated such as a system acquisition failure rate, a system access success rate, a system access failure rate and a system lost rate. In a preferred embodiment, the priority criteria used by the mobile station 2 during system acquisition/registration attempts is maintained in a priority data summary table. As illustrated in FIG. 5, a preferred embodiment of a priority data summary table 106 includes a system identifier, such as a SID 106a, NID 106b pair or a unique mode and frequency combination, the date and time of the last successful system acquisition/registration 106c, the acquisition success rate of the system 106d, the last power measurement of the corresponding signal 106e, the access success rate of the system 106f, the system lost rate 106g and a priority metric 106h that combines a plurality of other priority criteria into a single measure of the likelihood that the system will be useable.

The priority data may be stored in any form that allows priority criteria to be accessed or calculated by the processing circuitry 80. In a first alternative embodiment, the mobile station 2 maintains the priority data summary table 106 and does not store data describing each recent acquisition/registration attempt in a priority data table 104. In a second alternative embodiment, the mobile station 2 maintains the priority data table 104 and does not store summary data. In this embodiment, the processing circuitry 80 calculates the priority criteria in real time. In addition, it will be appreciated that the priority data table 104 and the priority data summary table 106 may be used to track any number of priority criterion.

Figures 6, 7:
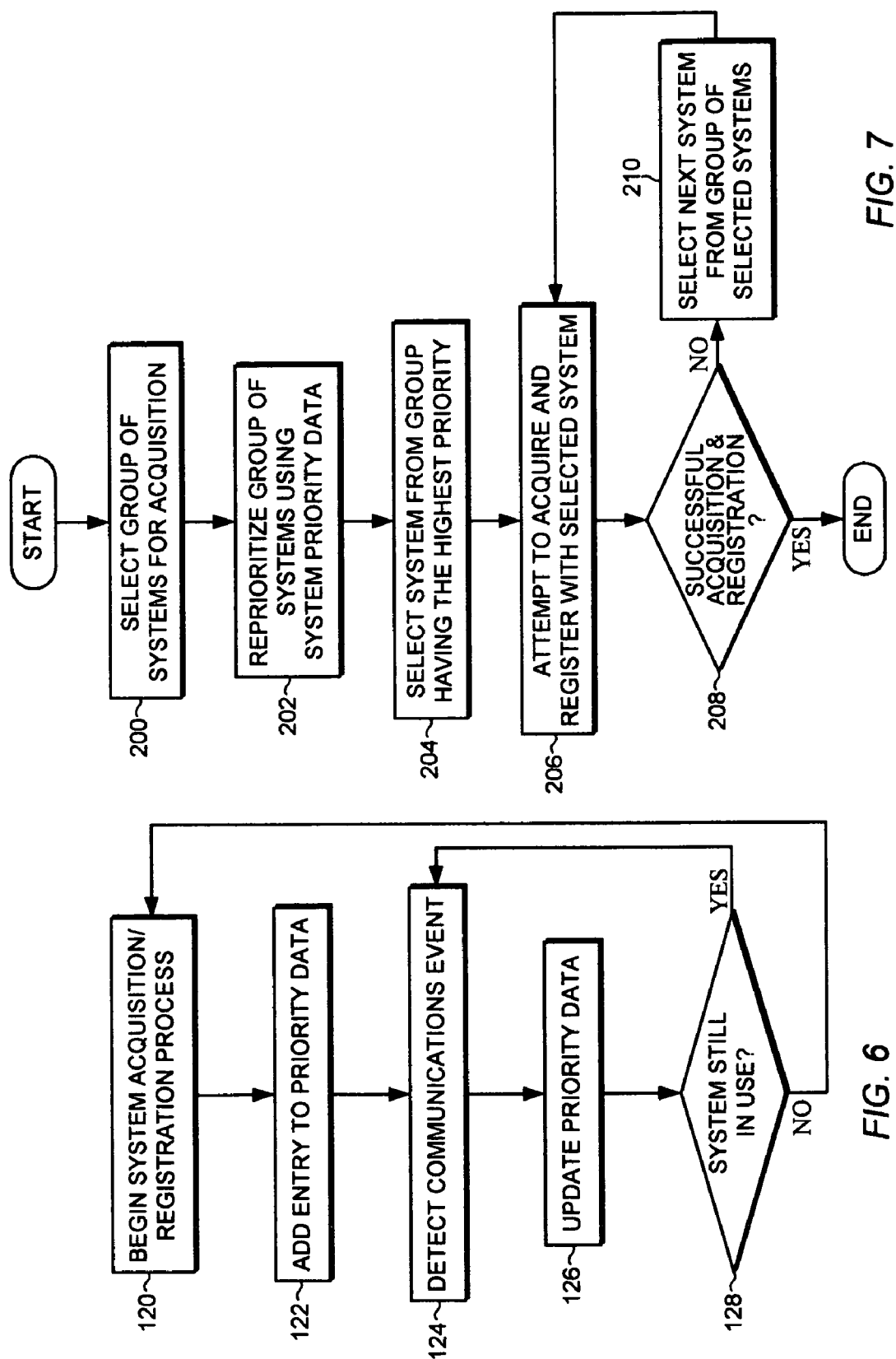
FIG. 6 is a flow diagram illustrating a preferred procedure for maintaining priority data.
FIG. 7 is a flow diagram illustrating a preferred system selection and acquisition procedure.

A preferred embodiment for maintaining the priority data 104 and priority data summary table 106 is illustrated in FIG. 6. The priority data 104 is preferably maintained by the system determination unit 96, but in alternative embodiments, the priority data 104 may be maintained by other components of the processing circuitry 80. After a system acquisition/registration process is initiated, Step 120, an entry is added to the priority data table 104 and a corresponding system identifier is stored in Step 122. In Step 124, a communications event is detected and, in Step 126, information describing the communications event is stored in the priority data 104. The priority data summary table 106 is also updated to reflect the occurrence of the detected event. Detectable communications events may include an acquisition attempt, acquisition failure or success, power measurement, system loss or other communications events that are recorded in the priority data 104. If the system is still in use, Step 128, then control passes back to Step 124 to detect the next communications event. If the system is no longer being used (e.g., system acquisition failure, system loss, etc.) then control passes back to Step 120 for the next system acquisition/registration attempt.

A preferred system acquisition procedure for the mobile station 2 will now be described with reference to FIG. 2 and the flow diagram of FIG. 7. The system acquisition procedure is preferably performed by the system determination unit 96, but in alternative embodiments, the system acquisition procedure may be performed by other components of the processing circuitry 80. In Step 200, a group of wireless communications systems is selected from a stored list of systems in accordance with a predetermined system selection procedure. In a preferred embodiment, wireless communications systems in the mobile station's geographic region 4 are selected from the PRL 10 and corresponding system identifiers and desirability information are stored in a table in the memory 82. In alternative embodiments, the table may include other data such as acquisition parameters and priority criteria for the selected systems. The systems are listed in the table in an order of priority (e.g., from the most desirable system to the least desirable system) as determined by the predetermined system selection procedure. Although system selection using a PRL is illustrated, it will be appreciated that the other system selection procedures may be used in accordance with the preferred embodiment of the present invention. For example, in alternative embodiments the group of systems may be selected from the MRU 108 or other stored systems lists.

In Step 202, the group of selected wireless communications systems is reprioritized using the system priority data 12. In a preferred embodiment, a plurality of the selected systems have the same level of desirability as determined by the preferred roaming list. At each level of desirability, the selected systems are sorted using the system priority data 12, from the most likely system to be acquired to the least likely system to be acquired. For example, the systems may be sorted using priority criteria such as acquisition success rate, access success rate or a priority metric.

In a first alternative embodiment, the entire group of selected systems is sorted using the priority criteria. For example, it is contemplated that a priority metric may be defined that incorporates both the desirability information and the priority criteria into a single score. In a second alternative embodiment, the desirability information for each selected system may be adjusted up or down based on the priority criteria. For example, the relative desirability of systems having a corresponding access success rate that is greater than a threshold value (e.g., 95%) may be adjusted upward, while the relative desirability of systems having a corresponding access failure rate that is greater than a threshold value (e.g., 95%) may be adjusted downward. The group of selected systems is then sorted using the adjusted desirability information.

In a third alternative embodiment, systems that meet (or fail to meet) certain priority criteria are removed from the group of wireless communications systems. For example, a system having a certain identified communications failure in its history may be avoided for a predetermined amount of time (i.e., an avoidance duration). In this embodiment, the priority data preferably includes an identifier of the communications failure and a corresponding avoidance duration associated with the identified communications failure.

After the group of selected systems is reprioritized, the mobile station 2 attempts to acquire and register with a wireless communications system. In Step 204, the system having highest level of priority is selected from the group of wireless communications systems. In a preferred embodiment, this system has a relatively high desirability level (as determined by the PRL) and there is a relatively high likelihood that the acquisition/registration attempt will be successful and the system will be useable. An attempt is made to acquire and register with the selected system in Step 206. If the acquisition/registration attempt is successful, Step 208, then the selected system is used by the mobile station 2 for wireless communications. If the acquisition/registration attempt is not successful, the wireless communications system having the next highest priority is selected from the group in Step 210 and control returns to Step 206 for the next acquisition/registration attempt.

Having thus described a preferred embodiment of the Method and Apparatus for Efficient Selection and Acquisition of a Wireless Communications System, it should be apparent to those skilled in the art that certain advantages of the within described system have been achieved. For example, it should be apparent that the use of priority data increases the likelihood that a successful system acquisition/registration will occur early in the system acquisition process. It should also be appreciated that various modifications, adaptations, and alternative embodiments thereof may be made within the scope and spirit of the present invention.

The scope of the present invention is defined by the following claims.

What is claimed:

1. A method of selecting a desirable system from a list of wireless communications systems stored in a mobile station, comprising the steps of:

maintaining, in the mobile station, a system priority data table based on acquisition/registration attempts by the mobile station with wireless communication systems, the system priority data table including a plurality of entries, each entry representing a single system acquisition/registration attempt by the mobile station and including a signal acquisition identifier, a power measurement, a system access identifier, and a system lost identifier;

generating a priority data summary table in the mobile station using priority criteria determined from the system priority data table, the priority data summary table including an acquisition success rate field, a last power measurement field, an access success rate field, and a system lost rate field;

predicting whether a future system acquisition/registration attempt on a selected wireless communications system is likely to be successful based on the priority data summary table;

predicting whether the selected wireless communications system is likely to be useable if the future system acquisition/registration attempt is successful based on the priority data summary table;

selecting, by the mobile station, a group of wireless communications systems from the list of wireless communications systems stored in the mobile station in accordance with a predetermined system selection procedure, the group of wireless communications systems having a first system acquisition order;

reprioritizing, by the mobile station, the group of wireless communications systems in accordance with the priority data summary table, the reprioritized group of wireless communications systems having a second system acquisition order based upon the likelihood of system acquisition/registration and the likelihood of usability; and attempting, by the mobile station, to acquire a desirable system based on the reprioritized group of wireless communications systems.

2. The method of claim 1 wherein the list of wireless communications systems is a preferred roaming list including a geographic region identifier, wherein the step of selecting a group of wireless communications systems comprises the steps of:

determining, by the mobile station, a current geographic region of the mobile station; and searching, by the mobile station, the preferred roaming list for wireless communications systems having a geographic region identifier that corresponds to the current geographic region of the mobile station, and wherein the first system acquisition order is dictated by the relative order of the selected wireless communications systems in the preferred roaming list.

3. The method of claim 1 wherein the step of maintaining further comprises the steps of:

detecting, by the mobile station, a communications event for a currently selected wireless communications system, the currently selected wireless communications system having a corresponding system identifier; and updating, by the mobile station, an entry in the system priority data to reflect the occurrence of the detected communications event, the updated entry including the corresponding system identifier.

4. The method of claim 3 wherein the corresponding system identifier includes a mode and a frequency.

5. The method of claim 3 wherein the step of updating further comprises calculating, by the mobile station, an occurrence rate of the detected event for the currently selected wireless communications system and storing the calculated occurrence rate.

6. The method of claim 5 wherein the detected event is a successful signal acquisition and the calculated occurrence rate is a signal acquisition success rate.

7. The method of claim 5 wherein the detected event is a failed system access attempt and the calculated occurrence rate is a system access failure rate.

8. The method of claim 1 wherein the step of reprioritizing comprises sorting, by the mobile station, the group of wireless communications systems in accordance with the priority criteria.

9. The method of claim 1 wherein, if the attempted system acquisition and access fails, the step of attempting is repeated with the next system in the reprioritized group.

10. The method of claim 1, wherein each wireless communications system stored in the mobile station has associated therewith a desirability level, and wherein reprioritizing comprises sorting the wireless communications systems, at each desirability level, in order of likelihood of acquisition/registration.

11. The method of claim 1, wherein each wireless communications system stored in the mobile station has associated therewith a desirability level, and wherein reprioritizing comprises generating a priority metric incorporating desirability level and the priority criteria defined in the priority data summary table, and sorting the wireless communications systems based on the priority metric.

12. The method of claim 1, wherein each wireless communications system stored in the mobile station has associated therewith a desirability level, and wherein reprioritizing comprises adjusting the desirability level up or down based on the priority criteria defined in the priority data summary table.

13. The method of claim 1, wherein reprioritizing comprises removing wireless communications systems from the group of wireless communications systems that do not meet a predefined threshold based on one or more of the priority criteria defined in the priority data summary table.

14. A mobile station comprising:
a memory, in the mobile station, for storing a preferred roaming list, a system priority data table, and a priority data summary table, the preferred roaming list including a first plurality of system identifiers and corresponding acquisition parameters; and
processing circuitry, in the mobile station, for:
maintaining the system priority data table in response to acquisition/registration attempts by the mobile station with wireless communication systems, the system priority data table including a plurality of entries, each entry representing a single system acquisition/registration attempt by the mobile station and including a signal acquisition identifier, a power measurement, a system access identifier, and a system lost identifier;
generating a priority data summary table in the mobile station using priority criteria determined from the system priority data table, the priority data summary table including an acquisition success rate field, a last power measurement field, an access success rate field, and a system lost rate field;
predicting whether a future system acquisition/registration attempt on a selected wireless communications system is likely to be successful based on the priority data summary table;
predicting whether the selected wireless communications system is likely to be useable if the future system acquisition/registration attempt is successful based on the priority data summary table;
selecting a group of wireless communications systems from the preferred roaming list in accordance with a predetermined system selection procedure, the group of wireless communications systems having a first system acquisition order; and
reprioritizing the group of wireless communications systems in accordance with the priority data summary table, the reprioritized group of wireless communications systems having a second system acquisition order based upon the likelihood of system acquisition/registration and the likelihood of usability.

15. The mobile station of claim 14, wherein the processing circuitry measures the power of a received signal corresponding to the currently selected wireless communications system and store the measured power in the system priority data.

16. The mobile station of claim 14, wherein the processing circuitry calculates the signal to noise ratio Ec/Io of a received signal corresponding to the currently selected wireless communications system and store the calculated signal to noise ratio Ec/Io in the system priority data.

17. The mobile station of claim 14, wherein the preferred roaming list comprises a plurality of wireless communications systems, each wireless communications system having associated therewith a desirability level, and wherein reprioritizing comprises sorting the group of wireless communications systems, at each desirability level, in order of likelihood of acquisition/registration.

18. The mobile station of claim 14, wherein the preferred roaming list comprises a plurality of wireless communications systems, each wireless communications system having associated therewith a desirability level, and wherein reprioritizing comprises generating a priority metric incorporating the desirability level and the priority criteria defined in the priority data summary table, and sorting the group of wireless communications systems based on the priority metric.

19. The mobile station of claim 14, wherein the preferred roaming list comprises a plurality of wireless communications systems, each wireless communications system having associated therewith a desirability level, and wherein reprioritizing comprises adjusting the desirability level up or down based on the priority criteria defined in the priority data summary table.

20. The mobile station of claim 14, wherein reprioritizing comprises removing wireless communications systems from the group of wireless communications systems that do not meet a predefined threshold based on one or more of the priority criteria defined in the priority data summary table.

* * * * *